July 18, 1939.  W. D. SCHANCK  2,166,730
RELIEF VALVE
Filed Oct. 26, 1937      4 Sheets-Sheet 1

INVENTOR.
William Dana Schanck
BY Cumpston & Shepard
his ATTORNEYS

Patented July 18, 1939

2,166,730

UNITED STATES PATENT OFFICE 2,166,730

RELIEF VALVE

William Dana Schanck, Rochester, N. Y., assignor to The Pfaudler Co., Rochester, N. Y., a corporation of New York Application October 26, 1937, Serial No. 171,063

10 Claims. (Cl. 277—20)

This invention concerns relief valves for relieving fluid pressure.

An object of the invention is to provide a generally improved relief valve which is more satisfactory than those heretofore known.

Another object is to provide such a relief valve which is effective to relieve excess fluid pressure on either side of the valve.

Still another object is the provision of such a valve which is free from all springs, thus obviating the expense of springs and the danger of faulty operation due to possible breakage of springs.

A further object is the provision of a relief valve in which the magnitude of pressure at which the valve will open or "blow" can be readily changed or adjusted within wide limits, and of a valve which will reliably function at the intended pressure.

A further object is the provision of a relief valve having one port arranged to open at a predetermined pressure and a second port arranged to open at a predetermined higher pressure, in case the fluid pressure continues to increase after the first port opens.

A still further object is the provision of a relief valve particularly arranged and adapted for application to a tank to prevent the existence of a vacuum within the tank and to prevent excessive pressure therein, although capable also of other uses.

A still further object is the provision, in a single unitary mechanism, of a combined vacuum relief, pressure relief, and blow out valve.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

In the first form of valve herein disclosed as an illustrative embodiment of the invention, the valve is intended to be attached to a tank, and to prevent the formation of a vacuum within the tank, and to permit pressure within the tank to build up to a predetermined magnitude, but to open when this magnitude of pressure is reached, preventing further increase of pressure. Such a valve is useful in many places, as for example, on the tanks of a brewery. In brewery practice it is common to hold the beer under certain pressure during part of the beer making process, but if the pressure should accidentally exceed the proper amount (as might happen for example if a pump were not turned off when the tank became full), then the tank might be damaged. Also, it sometimes happens that beer or other liquid may be withdrawn from a closed tank through an outlet near the bottom thereof, and if the opening of a vent is neglected, a vacuum may be created in the tank which may cause collapse or other damage to the tank. The first form of valve now to be described prevents any such damage either by vacuum or excessive pressure, and is capable of use wherever it is desired to avoid either vacuum or excess pressure in a tank, pipe line, or other receptacle or container.

Figure 1:
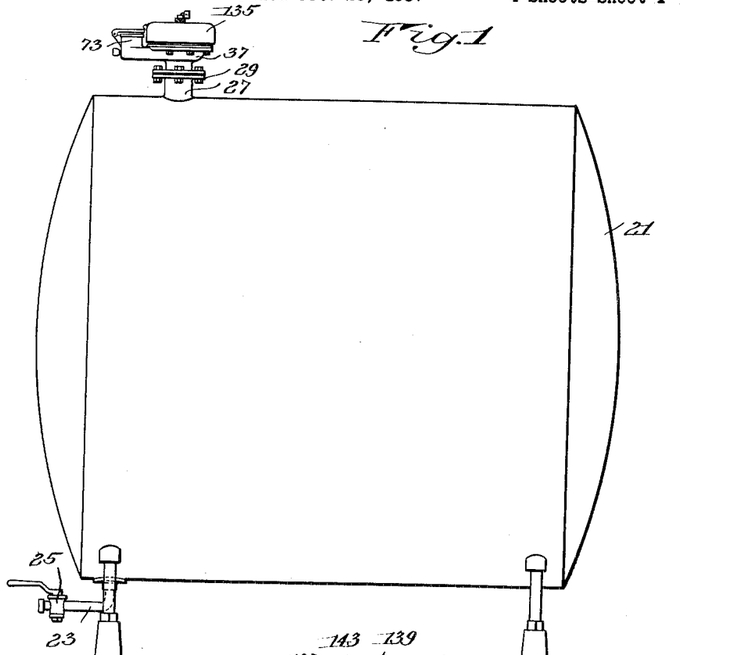
Fig. 1 is a side elevation of a tank having applied thereto a relief valve constructed in accordance with a preferred embodiment of the invention.

Merely to illustrate one use of the present valve, there is shown in Fig. 1 a tank 21 having an outlet conduit 23 leading from its bottom and controlled by a valve 25. Near the top of the tank is an upstanding annular flange 27 terminating in an outwardly extending radial flange 29.

Secured on the flange 29 with an interposed gasket 31 is the lower flange 33 of the valve body indicated in general by the numeral 37. This body has an interior chamber 39 (Fig. 7) the top of which is closed by a diaphragm 41 of flexible, resilient, and elastic material, such for example as natural or artificial rubber, or rubber-like composition. Near its center the diaphragm 41 is provided with a slit 43. The diaphragm may be circular or of any other convenient shape, and the marginal edge thereof is clamped between a flange 45 on the valve body 37, and an overlying ring 47 secured to the valve body by suitable means such as bolts 49.

In making the slit 43 in the diaphragm preferably no material is removed, but simply a cut is made through the thickness of the diaphragm material. When the diaphragm is mounted between the flange 45 and the ring 47, it is not tensioned or distended, but is clamped in position either in its normal undistended condition, or preferably with a slight radial compression. Such radial compression may be secured by confining the periphery of the diaphram within a band or flange of slightly smaller diameter than the normal diameter of the diaphragm, or preferably merely by the clamping action of the members 45 and 47 upon the margin of the diaphragm, which clamping action will exude some of the resilient diaphragm material in a radially inward direction, thus causing the desired slight radial compression. Such compression in the diaphragm will cause it to tend to deflect or belly out of the plane of its marginal edges, and when the pressure on both faces of the diaphragm is equal, it will assume some such bellied position as that illustrated in Fig. 9, the slit 43, however, remaining closed.

Overlying the top of the diaphragm, within the ring 47, is a plate 51 pivoted at 53 to a lug rising from one side of the ring 47. Diametrically opposite the pin 53 the ring 47 is provided with a lip 55 overlying the edge of the plate 51 to limit possible upward motion thereof. The plate 51 is of annular shape, having its center cut out as indicated at 57, the diameter of the hole 57 being substantially less than the diameter of the exposed under face of the diphragm, but being sufficient to overlie part or preferably all of the slit 43 and some of the surrounding area of the diaphragm. Surrounding atmospheric pressure may obtain access to the upper surface of the diaphragm through this opening 57.

With this construction, the slit in the diaphragm will open when the diaphragm is subjected to a sufficient difference in fluid pressure on opposite sides thereof, irrespective of which side has the higher pressure, but the plate 51 backs up the top surface of the diaphragm when the pressure on the bottom surface thereof is higher than on the top surface, and thus reduces the effective diameter of the diaphragm, so that the diaphragm will withstand a greater differential pressure on its under surface, before the slit 43 opens, than it will withstand on its upper surface.

Figure 7:
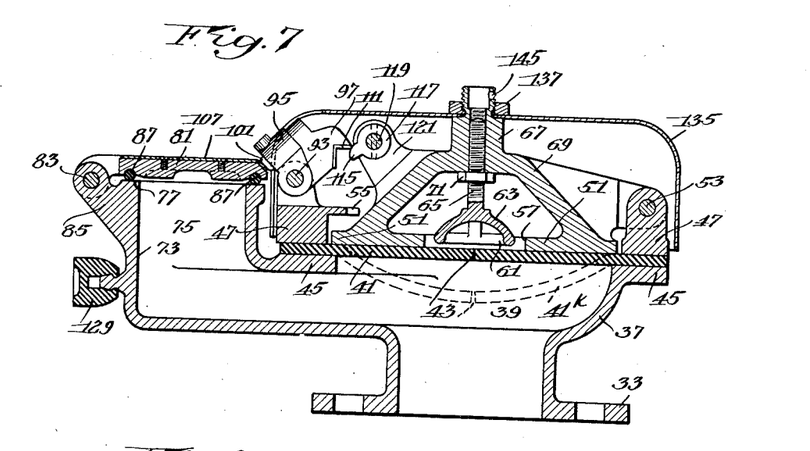
Fig. 7 is a vertical section taken centrally through the valve with the parts in one position.

If the pressure on the upper surface of the diaphragm is greater than that on the under surface, (as would occur if normal atmospheric pressure is acting on the upper surface, and if there is a partial vacuum within the chamber 39 in the valve casing 37) then the greater pressure on the upper surface will cause the diaphragm to deflect downwardly to the position shown in dotted lines at 41k in Fig. 7, thus tensioning the diaphragm and causing the slit 43 to be pulled open. The atmosphere will then rush in through the slit into the chamber 39, neutralizing the partial vacuum therein. It is seen that the atmospheric pressure on the top of the diaphragm acts throughout the entire area thereof determined by the inner diameter of the flange 45 which supports the diaphragm, and because of the large diameter subjected to pressure, the diaphragm slit will open with only a very slight excess of pressure on the upper side over that present on the lower side. In practice, it is found that the valve will open when the pressure within the valve casing is as little as one pound to the square inch below the atmospheric pressure acting on the top of the diaphragm, thus providing a vacuum relief valve of very great sensitivity.

If it is desired to permit the formation of a higher vacuum within the valve casing before the valve opens, this may be accomplished by reducing the inner diameter of the flange 45, or by inserting a separate backing plate beneath the diaphragm, the effect in either event being to reduce the effective diameter of the diaphragm and thus to increase the pressure difference required to open the slit. The pressure difference at which the valve operates may also be increased by increasing the thickness of the diaphragm, or by making it of stiffer or less resilient material.

Figure 8:
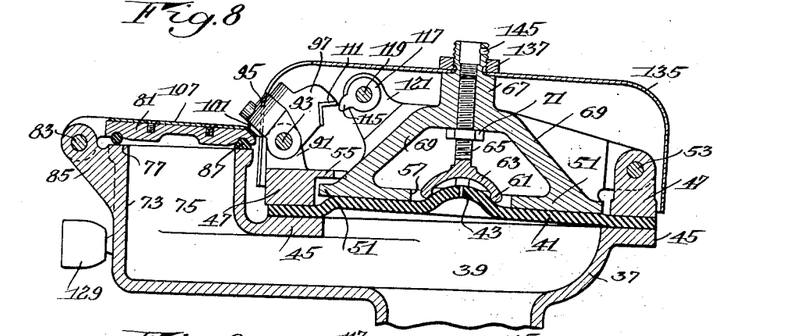
Fig. 8 is a similar view showing the parts in a different position.
Figure 9:
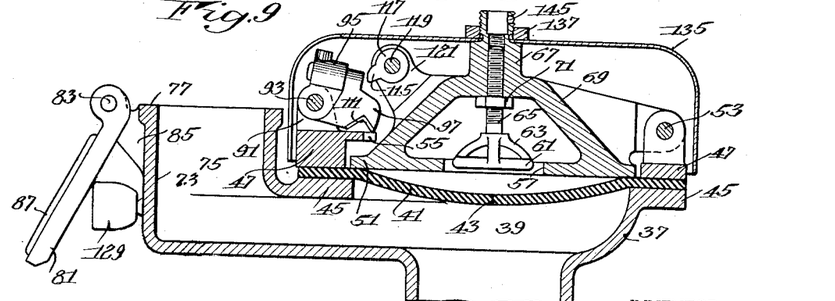
Fig. 9 is a similar view showing the parts in still another position.

If the higher pressure is on the lower side of the diaphragm (as would occur when atmospheric pressure acts on the top of the diaphragm and when the valve chamber 39 is subject to pressure higher than atmospheric) then when the pressure beneath the diaphragm becomes slightly higher than that above it, the diaphragm will be moved upwardly from the natural bellied position of Fig. 9 to some such position as that shown in full lines in Fig. 7, in which position the radial compression in the diaphragm will be fully effective to keep the slit 43 tightly closed. Further increase of the pressure on the lower face of the diaphragm will push upwardly on the diaphragm with greater force, moving the plate 51 upwardly as far as it will go under the influence of this particular degree of pressure, and causing that part of the diaphragm which is alined with the opening 57 to be deflected upwardly beyond the bottom surface of the plate 51. As this upward deflection of the central part of the diaphragm continues under increasing pressure, it will finally reach a point at which the slit 43 will open, as shown in Fig. 8, thus relieving the pressure by permitting escape of fluid (whether liquid or gas) from the lower side of the diaphragm through the open slit to the upper side of the diaphragm.

If it is desired to vary the degree of pressure required to open the diaphragm, this may be done by varying the size of the opening 57, as for example by substituting one or another of different rings 51 having different sized openings 57, or by screwing or otherwise fastening one or another of different size backing plates in the opening 57 to reduce it to various smaller sizes. More conveniently, however, the pressure at which the valve will open may be varied by using an adjustable backing member or overlying member, such as the annular ring 61 having inwardly and upwardly extending spokes 63 connected to a screw stud 65 screwed into a threaded boss 67 on a bridge 69 of skeleton form mounted on the plate 51. A lock nut 71 on the threaded shank 65 holds it in adjusted position. This ring 61 may, by turning its shank 65, be adjusted upwardly or downwardly so as to contact with the upper surface of the diaphragm at different extents of distention or bellying thereof, in the manner diagrammatically indicated in Fig. 8. When the pressure on the diaphragm causes it to contact with the ring 61, then further upward distention of the diaphragm to open the slit must occur mainly within the area outlined by the ring 61, which increases the pressure required to produce opening.

By turning the shank 65 to move the ring 61 upwardly away from the diaphragm, the pressure required beneath the diaphragm to open the slit 43 is decreased, and by moving the ring 61 downwardly, the pressure required is increased. Thus by adjusting the ring 61 upwardly or downwardly, a fine adjustment is secured of the pressure required within the chamber 39 over and above atmospheric pressure, in order to open the valve. Yet this adjustment is entirely independent of and does not affect the pressure required to open the valve in the opposite direction, when the pressure within the chamber 39 is below atmospheric pressure. By the use of this adjustment, the valve may be set to open at any desired pressure within reasonable limits, and a single valve may be adjusted to open at any desired pressure in the range, for example, of five pounds to thirty pounds per square inch above atmospheric pressure. Such a valve is found to be fluid tight until the pressure builds up to within a very small amount (one pound per square inch, for example) of the pressure for which the valve is set to open. By making the diaphragm of thicker or thinner material, or of material having greater or less resilience, further variation in the pressure at which the diaphragm slit will open may be obtained. By using one or more of the above mentioned variable factors or adjustment features, valves may be made to open at pressure differentials ranging from about one pound per square inch or lower, up to several hundred pounds per square inch.

The parts so far described constitute a satisfactory and efficient relief valve for many purposes, without the necessity of additional parts. Sometimes, however, it is desired to provide an additional outlet port or blow out port which will be opened upon excess pressure, in case the pressure within the chamber 39 builds up faster than it can be relieved through the slit 43 after this slit opens. If the valve is applied to a tank into which liquid is being pumped, for example, and if the pump is improperly allowed to run after the tank becomes full, it is possible that the rate at which liquid is pumped into the tank may be greater than the rate at which it can escape through the slit 43, in which event additional outlet port means should be provided to prevent damage.

This may be done by extending the valve casing 37 in a leftward direction when viewed as in Figs. 3, 4, and 7 to 9, to a casing section 73 open at the top and constituting an outlet or blow out port 75 having an upper edge 77 forming a valve seat, the port being normally closed by a valve member 81 hinged at 83 to a bracket 85 on the casing, the valve member carrying on its under surface a gasket 87 to contact with the seating surface 77 around the port 75. If preferred, the gasket may be mounted on the casing 73 and contact with a seating surface on the valve member 81. In either event, the gasket is preferably of highly resilient and elastic material, such as natural or synthetic rubber or rubber-like composition, and has sufficient thickness so that it may be compressed to a substantial extent by sufficient downward pressure on the valve member 81.

Figures 3, 4, 5, 6:
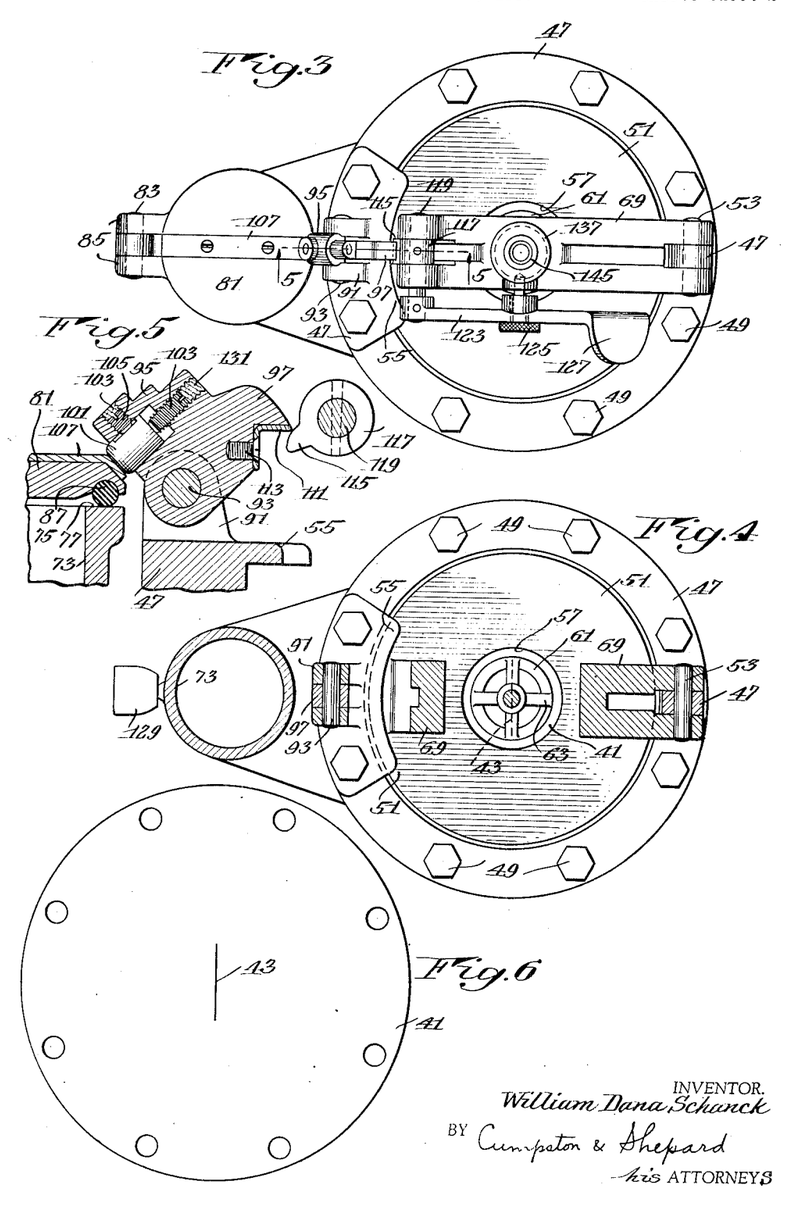
Fig. 3 is a plan of the valve, with the covering casing removed to show the parts beneath.
Fig. 4 is a horizontal section substantially on the line 4—4 of Fig. 2.
Fig. 5 is a vertical section taken substantially on the line 5—5 of Fig. 3.
Fig. 6 is a face view of a flexible diaphragm constituting part of the valve.

The ring 47 is provided with a pair of upwardly extending lugs 91 to which is pivoted at 93 a bell crank lever having one arm 95 and another arm 97 at a substantial angle to the first arm. As best shown in Fig. 5, the arm 95 is provided with a recess which receives a plug 101 held against inward longitudinal movement by a set screw 103 axially alined with the plug and by another set screw 105 pressing tightly against the side of the plug. When the parts are in normal position, the end of the plug 101 bears against an inclined portion of a hardened wear plate 107 extending across the top of the valve member 81 and suitably secured thereto as by means of screws.

Figure 2:
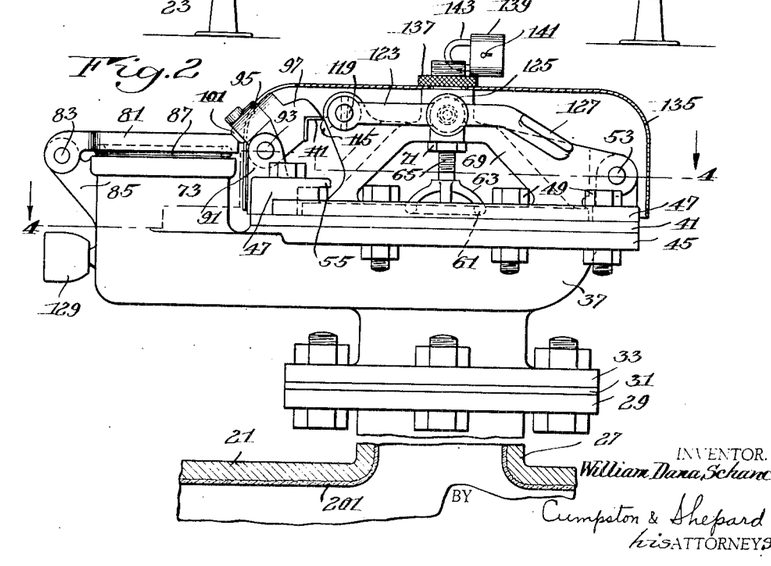
Fig. 2 is a side elevation of the preferred form of valve and a fragment of the tank, with parts in vertical section.

The other arm 97 of the bell crank lever is provided with a hardened wear plate 111, held in place by means of a screw 113, which wear plate normally overlies and contacts with a cam projection 115 extending outwardly from a hub or collar 117 pinned to a shaft 119 rotatably mounted in bearings in lugs 121 extending upwardly from the skeleton bridge 69 on the plate 51. The shaft 119 is normally prevented from turning in its bearings by means of an arm 123 (Figs. 2 and 3) pinned to the shaft and extending a substantial distance laterally therefrom and normally held against oscillating movement by means of a stud 125 inserted through the arm 123 and screwed into a threaded opening in the bridge 69. By unscrewing and removing the stud 125, the arm 123 is freed so that by grasping the finger piece 127 at the end of the arm, the arm may be oscillated around the axis of the shaft 119 turning the shaft and the cam 115 with it.

When the parts are in normal position, with the arm 123 locked by the pin 125, the plug 101 on the bell crank lever bears against the wear plate 107 on the valve member 81 and the wear plate 111 on the bell crank lever is immediately above the cam 115, in the position shown in Figs. 5 and 7, resisting upward motion of the cam 115 and thus resisting upward movement of the plate 51 from its lowermost position, which is illustrated in Fig. 7.

When the pressure within the chamber 39 exceeds the atmospheric pressure acting on the top of the diaphragm, the upward force exerted on the diaphragm tends to move the plate 51 upwardly about its pivotal axis 53, and thus produces an upward thrust of the cam 115 against the arm 97 of the bell crank lever. This thrust tends to rotate the bell crank lever about its pivot 93 in a counterclockwise direction when viewed as in Figs. 5 and 7, but such rotation is resisted by the engagement of the plug 101 on the arm 95 with the valve member 81.

Since the gasket 87 is compressible and resilient, the downward pressure of the bell crank on the valve member will compress this gasket to a degree depending upon the magnitude of pressure of the bell crank on the valve member 81, which in turn depends upon the magnitude of the pressure difference acting on opposite sides of the diaphragm 41. As the pressure within the valve casing increases, the gasket 87 compresses more and more, allowing the bell crank lever to turn slightly in a counterclockwise direction until the parts assume some such position as shown in Fig. 8. Then, upon a somewhat further increase in pressure and further decrease of thickness of the gasket, the cam or nose 115 slips upwardly past the wear plate 111 of the bell crank lever, whereupon the bell crank lever is released from the upward thrust of the cam and is free to turn in a clockwise direction, which it immediately does under the influence of the upward pressure tending to open the pivoted valve member 81. It swings around far enough so that it no longer overlies the valve member 81, and this valve member is forced upwardly and backwardly, around its pivot 83, to a fully open position. A buffer member 129, of rubber or the like, may be provided to receive the impact of the valve 81 when it opens, to prevent damage to the parts.

In Fig. 8, the parts are illustrated in the position they assume just before the cam 115 slips past the bell crank lever, and in Fig. 9 they are shown in position after such slipping past occurs, with the valve 81 fully open. As soon as this valve 81 opens, it provides a large outlet port, substantially larger than the slit 43, so that the fluid (whether liquid or gas) within the valve casing may readily escape through the open port 75.

The area of the port 75 and valve 81, although substantially larger than the maximum open area of the slit 43, is preferably smaller than the exposed area of the under side of the diaphragm 41. Hence, for any given pressure within the valve casing, the upward pressure exerted upon the plate 51 and cam 115, tending to move the bell crank 95, 97 in a counterclockwise direction, will be greater than the upward pressure exerted on the valve 81 tending to move the bell crank in a clockwise direction. Moreover, the effective length of the lever arm 95 of the bell crank lever may be somewhat shorter than the effective length of the lever arm 97, to assist further in permitting the upward pressure of the cam 115 to overcome the upward thrust of the fluid pressure on the under side of the valve 81 plus the upward thrust caused by compression of the gasket 87. Preferably the parts are so arranged that a radius drawn from the bell crank pivot 93 to the effective end of the plug 101, makes a substantial angle with a radius drawn from the valve pivot 83 to the effective end of the plug 101. Thus the bell crank does not have to swing through a great angle before the valve 81 clears it, but the valve may swing open past the bell crank when the latter moves clockwise through only a relatively small angle from the positions shown in Figs. 5, 7, and 8.

The degree or magnitude of pressure at which the valve 81 will open is that pressure which will cause the gasket 87 to be compressed sufficiently far so that the cam 115 may slip past the bell crank arm 97. This degree of pressure required for opening the valve may be adjusted by loosening the set screw 105 and adjusting the screw 103 to retract or project the plug 101. Preferably the screws 103 and 105 are shorter than the tapped bores into which they are screwed, and after the screws have been properly set, the ends of the bores above the screws are filled with sealing wax, molten lead, or other sealing material 131, on which a seal is impressed, to prevent unauthorized tampering with the setting.

The parts are so adjusted that the valve 81 will not open until a higher pressure is reached than that sufficient to open the slit 43. Thus, when pressure increases within the valve casing, the slit 43 will first open when the required pressure is reached. If the rate at which fluid is being introduced into the tank 21 does not exceed the rate at which fluid may escape through the slit 43 when the latter is open to its maximum extent, then the valve 81 will not open at all, but fluid will simply escape through the slit 43 and prevent the pressure from building up any further. If fluid is being introduced into the tank 21 faster than it can escape through the slit 43, however, the pressure within the valve casing will continue to increase even after the slit opens, and then upon a further increase in pressure, to an extent depending upon the adjustment of the plug 101, the valve 81 will open and provide a larger escape port than that provided by the slit 43. This will quickly relieve the pressure, allowing the plate 51 and the diaphragm 41 to drop back by gravity to the positions shown in Fig. 9, when the pressure within the valve casing falls to atmospheric pressure.

If the extent of opening of the slit 43 is sufficient to prevent further increase of pressure without opening the valve 81, then when the pressure subsequently decreases (for example, upon turning off the flow of fluid into the tank 21), the slit 43 will close up again when the pressure drops to the point at which the valve is set to open, and this degree of pressure will be automatically maintained within the tank, so far as the relief valve is concerned. If, however, the pressure has increased to such an extent as to open the valve 81, pressure can not thereafter be maintained in the tank until the valve 81 is restored to closed position, for the valve 81, unlike the valve 43, does not close again automatically upon a reduction of pressure. In order to restore the valve 81, the pin or stud 125 is removed, and the finger piece 127 of the lever 123 is lifted to turn the shaft 119 and withdraw the cam 115 from the path of the lever arm 97 of the bell crank. Then, if the valve 81 is closed by hand, the bell crank can be swung back in a counterclockwise direction from the position shown in Fig. 9 to the closed position shown in Figs. 5 and 7, whereupon the lever 123 is moved back to its initial or normal position, moving the cam 115 to normal position underlying the bell crank arm 97, as shown in Figs. 5 and 7, and the lever 123 is fastened again by means of the stud 125.

At times, it may be desired to prevent restoring the valve 81, once it has been opened, until authority has been obtained from some official, or until a report has been made to some official of the opening of the valve. When this is desired, a canopy or casing 135 may be provided, mounted on the upper part of the portion 67 of the bridge 69, as shown in Figs. 2 and 7 to 9, which casing extends over the lever 123 and has an annular depending flange surrounding the upper part of the valve mechanism as shown, and extending downwardly sufficiently far to prevent access to the lever 123 and the pin 125. The casing 135 is held in place by a thumb nut 137 threaded on the top of the part 67, and unauthorized removal of this thumb nut may be prevented by any suitable locking means, such as the pad lock 139 (Fig. 2) controlled by a key inserted through a key hole 141, the bow 143 of the lock being passed through a hole 145 (Fig. 7) in the upper end of the member 67. Upon obtaining the proper key for the pad lock, the pad lock may be removed, permitting removal of the thumb nut 137 and of the casing 135, whereupon access may be obtained to the lever 123 for the purpose of properly closing the valve 81 and restoring the bell crank 95, 97 and the cam 115 to proper cooperative relationship.

A modified form of relief valve is illustrated in Figs. 10 to 13, inclusive, in which the valve body or casing 37a has a flange 33a for attachment to a tank or other desired article, and a flange 45a for supporting the diaphragm 41a which may be identical with the diaphragm 41 previously described and which has a slit 43a similar to the slit 43 above mentioned. The upper or overlying plate 51a may be either pivoted, like the plate 51 of the previous embodiment, when a supplementary valve is to be operated thereby, or may be in fixed stationary position, when no supplementary valve is needed. In the embodiment shown in Figs. 10 and 11, this plate 51a is stationary and is held in place by bolts 49a passing through the plate 51a and the flange 45a and through holes or notches in the interposed diaphragm 41a. The plate 51a is provided with an opening 57a which, unlike the opening 57 above described, is not circular but is of different width or extent in different directions. The maximum width or dimension of the opening 57a is preferably greater than the length of the slit 43a, while the minimum dimension or narrowest part of the opening is preferably less than the length of the slit and the dimension of the opening in other directions varies between this maximum and minimum.

In this construction, the pressure required to cause the slit to open when the pressure within the valve casing exceeds atmospheric pressure, is adjusted or varied by alining the slit 43 with different dimensions of the opening 57a, so that a greater or smaller length of the slit is alined with the opening. When the slit is alined with the long dimension of the opening, as in Fig. 11, a lower pressure within the valve casing is sufficient to cause the valve slit to open. When the slit is alined with the smallest dimension of the opening, as in Fig. 13, then the plate 51a covers more or less of the ends of the slit, reducing the effective length of the slit and reducing the dimension in a direction parallel to the slit of that area of the diaphragm which is free to be deformed upwardly by the pressure within the valve casing, and this is found to require a substantially higher pressure to cause the valve slit to open. Between these two extreme positions the slit 43a may be placed in other desired positions, such as that shown in Fig. 12, where the length of the slit alined with the opening is greater than that in Fig. 13, but less than that in Fig. 11. When the opening is of approximately elliptical shape, as preferred and as here illustrated, then an almost infinite number of gradations of setting between the maximum pressure setting of Fig. 13 and the minimum pressure setting of Fig. 11 may be secured by turning the diaphragm in one direction or the other relatively to the opening.

This manner of adjusting the opening pressure or blow off pressure of the valve is relatively simple and requires no extra parts. This adjustment, like the adjustment obtained by moving the ring 61 previously described, does not affect the pressure at which the valve will open in one direction (when the pressure on the upper side of the diaphragm is greater than that below) but affects or varies only the opening pressure in the opposite direction (when the pressure below the diaphragm is greater than that above). If it is desired to vary the pressure at which the valve will open when the pressure above the diaphragm is greater than that below, then a backing plate may be placed beneath the diaphragm, to back up any desired part of the area thereof, and the opening in such plate may be either circular (like the opening 57 in the plate 51) or non-circular (like the opening 57a in the plate 51a). If a non-circular opening in such bottom plate is employed, it may be the same as or different from the opening 57a in the top plate 51a and it may be alined with the opening in the top plate or may be set at an angle thereto. By using below the diaphragm a plate identical with the plate 51a above the diaphragm, with the opening alined therewith, the valve would be made to open at the same pressure difference in either direction. By using the same kind of plate below the diaphragm but by turning the axis of the elliptical opening of the bottom plate at an angle to the axis of the opening in the top plate, the valve would be made to open at one pressure difference in one direction and at a different pressure difference in the opposite direction. Thus a construction of great flexibility and adaptability is provided.

To aid in setting the relief valve to desired pressure, a series of graduations 58 may be provided around the periphery of the opening 57a, and the various pressures at which the diaphragm will open when the slit 43a is alined with one or another of these graduations may be determined by experiment or otherwise. When once these pressures are determined, the valve may be quickly set to open at any desired one of these pressures by placing the diaphragm slit in alinement with the desired graduation. A change in setting may be made by loosening the bolts 49a and turning the plate 51a, leaving the diaphragm stationary, or by turning the diaphragm, leaving the plate stationary.

Figure 15:
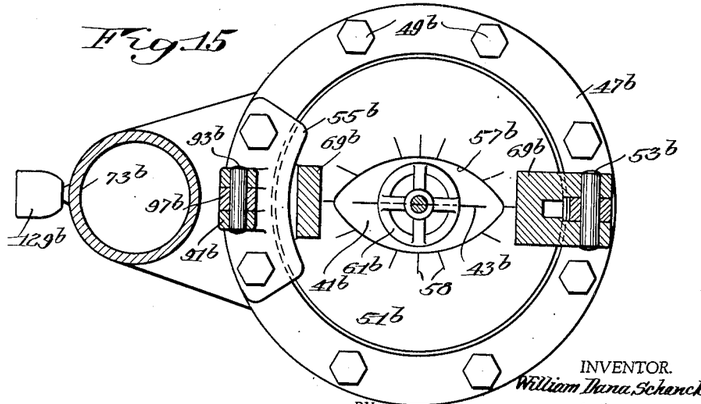
Fig. 15 is a horizontal section substantially on the line 15—15 of Fig. 14.

In some instances, the pressure at which the valve will open or blow off may be varied partly by using the non-circular opening idea illustrated in Figs. 10 to 13, and partly by using the adjustable ring 61 of the first embodiment above described. Such a construction is illustrated in Figs. 14 and 15, wherein the various parts, except for the opening 57, may be the same as those of the first embodiment illustrated in Figs. 2 to 9, inclusive, and are designated respectively by the same reference numerals used in Figs. 2 to 9 with the addition of the letter "b" to each numeral. The opening 57b in this embodiment, as shown in Fig. 15, is of non-circular shape, preferably being approximately elliptical, like the opening 57a in the embodiment shown in Figs. 10 to 13. By alining the diaphragm slit 43b with various different dimensions of the opening 57b (as described in connection with Figs. 10 to 13), the pressure difference on opposite sides of the diaphragm required to cause opening of the slit may be varied. By adjusting the ring 61b closer to or farther away from the normal unflexed position of the diaphragm, the pressure required for opening may also be varied. By a combination of these two adjusting means (that is, by varying the position of the slit with relation to the opening, and by varying the position of the ring with respect to the diaphragm), great flexibility of adjustment, within wide limits, may be secured.

Figures 10, 11, 12, 13, 14:
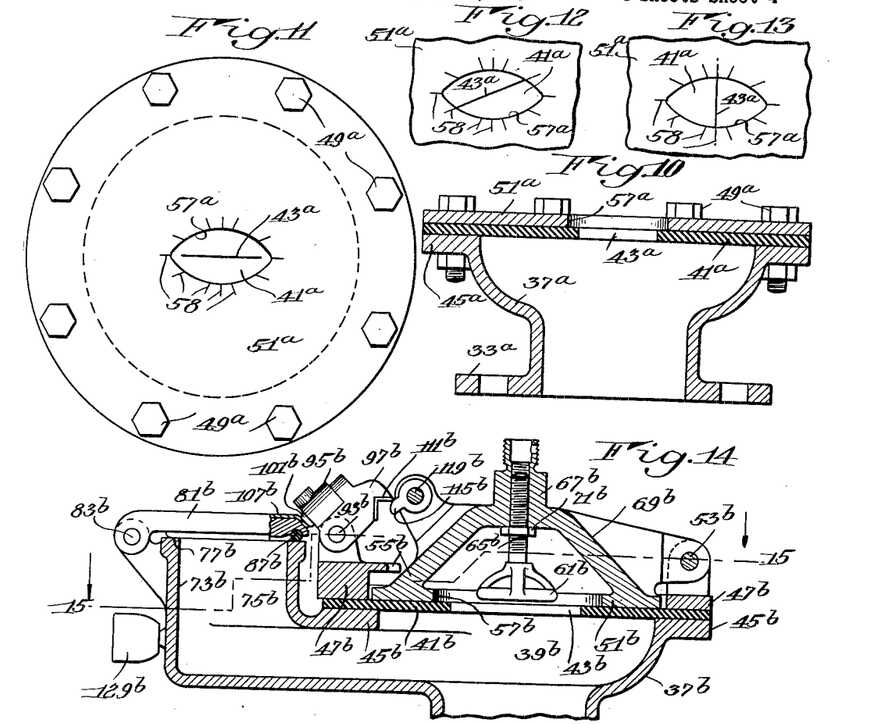
Fig. 10 is a vertical section through a modified form of construction.
Fig. 11 is a plan of the valve shown in Fig. 10, adjusted to open at one pressure.
Fig. 12 is a plan of a fragment of the valve, adjusted to open at a higher pressure.
Fig. 13 is a similar fragmentary plan of the valve adjusted to open at a still higher pressure.
Fig. 14 is a vertical section through still another modified construction in accordance with the invention.

If a supplementary valve is desired, it may be employed, as illustrated in Figs. 14 and 15, the supplementary valve mechanism being the same as that disclosed in the first embodiment (Figs. 2 to 9). The constructions above described as illustrative examples of the invention have been designed primarily for use as relief valves to prevent building up any substantial vacuum or any excessive pressure in a tank or the like to which such valves are attached. In these constructions, atmospheric pressure operates on one side of the diaphragm. Those skilled in the art will recognize, however, that the functioning of the valve depends merely upon differences in pressure on opposite sides of the diaphragm, and not upon atmospheric pressures. Hence it is not necessary that one side be subjected to atmospheric pressure, and both sides of the diaphragm may, if desired, be subjected to super-atmospheric or sub-atmospheric pressures, the valve thus being capable of use as a pressure reducing valve or in many other fields besides that of relief valves.

The valve body or casing may be made of any desired material, metal being preferred, although a molded composition may be employed, if desired. If desired, the interior surface of the valve body, wherever it may come into contact with the fluid in the tank, pipe line, etc., with which the valve is used, may be lined or coated with glass or other suitable coating, and the tank or pipe line itself may be similarly lined, such a lining being indicated at 201 in Fig. 2. Stainless steel or other non-corrosive metals may be employed in constructing the valve.

In any of the illustrative embodiments of the invention above described, the valve may be made of various different sizes or dimensions. Without intending to place any limitation upon possible sizes, but merely for the sake of example, it may be stated that good results have been obtained from using a diaphragm 41 having an outside diameter of above 8 inches and a thickness of about $\frac{1}{16}$ inch, the slit 43 being about 1½ inches long, the other parts of the valve mechanism being of about the same proportions to these dimensions as are indicated in the accompanying drawings.

While certain embodiments of the invention have been disclosed, it is understood that the inventive idea may be carried out in a number of ways. This application is therefore not to be limited to the precise details described, but is intended to cover all variations and modifications thereof falling within the spirit of the invention or the scope of the appended claims.

Certain subject matter disclosed but not claimed herein is claimed in the divisional application filed December 31, 1938, Serial No. 248,720.

I claim:

1. A relief valve comprising a casing having two openings, separate closure means for closing each of said openings, both of said closure means being subject to pressure within said casing, one of said closure means being shiftable to an open position, latch means for holding said shiftable closure means in closed position, and means controlled by the other of said closure means for releasing said latch means so that said shiftable closure means may move to open position, increasing outward pressure on said other closure means being effective first to hold said shiftable closure means more firmly in closed position and finally to release said shiftable closure means when a critical pressure point is reached.

2. A relief valve for venting fluid pressure within a casing to atmosphere, comprising a casing having two openings, separate movable closure means for closing each of said openings, both of said closure means being subject on one side to fluid pressure within said casing and on the other side to atmospheric pressure and one of said closure means being of materially larger area than the other, so that super-atmospheric fluid pressure within said casing will exert a greater force on said larger closure means than upon the smaller one, said smaller closure means being movable outwardly to an open position, and interacting latch means tending to hold both of said closure means in predetermined closed position, said latch means being effective to release said smaller closure means for full opening movement thereof when the force exerted on said latch means by said larger closure means exceeds a predetermined amount.

3. A relief valve comprising a casing having an opening and a seat associated with said opening, movable closure means for closing said opening, a gasket of resilient compressible material interposed between said closure means and said seat, diaphragm means subjected to pressure within said casing and tending to move outwardly under the influence of such pressure, and a pivoted lever tending to hold said diaphragm means against outward movement and said closure means against opening movement, said lever being so arranged that outward pressure on said diaphragm means will tend to force said closure means toward said seat and compress said gasket, and that when the outward pressure on said diaphragm means reaches a magnitude sufficient to compress said gasket to a predetermined extent, said diaphragm means slips past said lever, releasing said lever so that said closure means may open.

4. A relief valve comprising a casing having an opening and a seat associated with said opening, movable closure means for closing said opening, a gasket of resilient compressible material interposed between said closure means and said seat, diaphragm means subjected to pressure within said casing and tending to move outwardly under the influence of such pressure, a lever, and pivot means intermediate the ends of said lever on which said lever may oscillate, said lever having a first arm overlying said closure means and a second arm overlying a portion of said diaphragm means, said arms being so arranged that contact of said first arm with said closure means tends to hold said second arm in position preventing outward movement of said diaphragm means, and that outward pressure of said portion of said diaphragm means against said second arm will press said first arm more tightly against said closure means and tend to compress said gasket, outward pressure of said portion of said diaphragm means of more than a predetermined magnitude being effective to compress said gasket to a sufficient extent to permit said lever to move far enough so that said portion of said diaphragm may move past said second arm and thus relieve the pressure of said first arm against said closure means, allowing said closure means to open.

5. A relief valve comprising a casing having an opening, movable closure means for closing said opening, said closure means being movable from closed position in an outward direction to open position, diaphragm means subjected on one side to fluid pressure within said casing and on the other side to fluid pressure externally of said casing, said diaphragm means including a movable portion tending to move in an outward direction when the fluid pressure within said casing exceeds that externally thereof and also including a resilient flexible element having therein a slit which establishes communication between the interior of said casing and the exterior thereof when the slit is open, said slit being normally closed when the fluid pressures on opposite sides of said diaphragm means are equal and being opened by deformation of said flexible element caused by predetermined pressure differences on opposite sides thereof, to admit fluid into said casing when the pressure within said casing is a predetermined extent less than the pressure outside thereof and to permit escape of fluid from said casing when the pressure within said casing is a predetermined extent greater than the pressure outside thereof, and means normally holding said closure means in closed position and effective upon outward movement to a predetermined extent of said portion of said diaphragm means to release said closure means so that said closure means may move to open position and allow escape of fluid from said casing through said opening.

6. A relief valve comprising a casing having an opening, movable closure means for closing said opening and mounted for opening movement in an outward direction, lever means for overlying said closure means to hold it normally in closed position, movable diaphragm means subjected to pressure within said casing and tending to move outwardly with respect to said casing upon increase of said pressure, said diaphragm means including a projecting part cooperating with said lever means to hold said lever means in position to maintain said closure means closed until said pressure increases to a predetermined magnitude, whereupon said part may slip past said lever means and release said lever means to release said closure means for opening movement, and means for shifting said part to non-cooperating relationship to said lever means in order to move said part past said lever means when restoring said closure means, lever means, and diaphragm means to normal position after an opening movement of said closure means.

7. A relief valve comprising a casing having an opening, movable closure means for closing said opening and mounted for opening movement in an outward direction, lever means for overlying said closure means to hold it normally in closed position, movable diaphragm means subjected to pressure within said casing and tending to move outwardly with respect to said casing upon increase of said pressure, said diaphragm means including a projecting part cooperating with said lever means to hold said lever means in position to maintain said closure means closed until said pressure increases to a predetermined magnitude, whereupon said part may slip past said lever means and release said lever means to release said closure means for opening movement, means for shifting said part to noncooperating relationship to said lever means in order to move said part past said lever means when restoring said closure means, lever means, and diaphragm means to normal position after an opening movement of said closure means, shiftable casing means having a normal position surrounding said projecting part sufficiently far to prevent access to said part to shift it to said non-cooperating relationship, and key controlled locking means for holding said casing means in said normal position.

8. A relief valve as described in claim 6, in which said diaphragm means includes a flexible member of rubber or rubber-like composition having a slit or other suitably shaped orifice therein to open automatically when said diaphragm means is subjected to a predetermined pressure lower than that necessary to effect opening of said closure means.

9. A relief valve including a diaphragm of resilient flexible material having a slit therein, said slit being normally closed when fluid pressure on opposite sides of the diaphragm is equal and being opened by displacement of that part of the diaphragm immediately around said slit in response to differences in fluid pressure on opposite sides of the diaphragm, a backing plate adjacent one side of said diaphragm against which said diaphragm may bear when there is an excess of pressure on the opposite side of the diaphragm, said backing plate being movable in response to pressure exerted on it by said diaphragm and having an aperture alined with at least a part of said slit, a relief port having, when fully open, an effective flow capacity substantially greater than that of said slit in said diaphragm, a valve member normally closing said port and shiftable from closed position to an open position, means normally holding said valve member in closed position, and means effective upon movement of said backing plate in response to excess pressure on said diaphragm, for releasing said holding means so that said valve member may be opened to relieve said excess pressure at a faster rate than it can be relieved through said slit.

10. A relief valve comprising a casing having an opening, pivoted closure means for closing said opening, said closure means being mounted to swing from closed position outwardly to an open position so that increasing fluid pressure within said casing tends with increasing force to open said closure means, an arm connected to said closure means to swing therewith, a pressure responsive device under the influence of pressure within said casing, and means controlled by said pressure responsive device for pressing against said arm in a direction to keep said closure closed with increasing pressure on said arm as increasing fluid pressure acts on said pressure responsive device until said pressure reaches a predetermined magnitude, and for then releasing the pressure on said arm so that said closure may swing open, when said pressure reaches said predetermined magnitude.

WILLIAM DANA SCHANCK.